May 26, 1959 F. W. HASSETT 2,887,806
LAMINATED PRODUCT AND MANUFACTURE THEREOF
Filed Oct. 9, 1956

INVENTOR.
Frederick W. Hassett
BY
Webb, Mackey & Burden
HIS ATTORNEYS

United States Patent Office 2,887,806
Patented May 26, 1959

2,887,806

LAMINATED PRODUCT AND MANUFACTURE THEREOF

Frederick W. Hassett, Ellwood City, Pa., assignor to American Window Glass Company, Pittsburgh, Pa., a corporation of Pennsylvania Application October 9, 1956, Serial No. 614,979

11 Claims. (Cl. 41—21)

The present invention relates to a laminated product and to the manufacture thereof. More particularly, it relates to a transparent or translucent panel of laminated glass having a permanent reticular pattern within the body of the glass and which does not extend to the surfaces of the product. A highly decorative laminated product having many uses is provided by this invention.

A panel according to the present invention is a unitary structure formed by laminating and by subsequently shattering a tempered middle class lite or sheet which has been laminated between outer lites of sheet or plate glass. More specifically, a complete structure or unit is composed of a lite of sheet or plate glass, a layer of resin, plastic, or other bonding material, a lite of tempered glass, another layer of the bonding material, and finally another lite of sheet or plate glass. The shattering of the lite of tempered glass is accomplished by a sharp instrument which is used to nick the edge of the sheet along a strain line after the components have been brought together and at least partially laminated. However, instead of the shattered fragments falling apart in the expected manner, they are held in place between the outer lites to form small but perceptible cleavage lines. The resulting reticulated pattern forms a pleasing and attractive subsurface design in the glass panel.

This invention, therefore, provides highly decorative and attractive laminated glass panels, being equally well adapted for installation as windows, doors, glass partitions and the like, and in its broader aspects the invention provides an equally attractive arrangement when embodied in glass containers and other articles having flat or curved walls or having a cover or partition structure with the reticulated decoration therein.

Further features, objects and advantages will be specifically pointed out hereinafter or will be apparent from the ensuing description taken in conjunction with the accompanying drawings, which show a preferred embodiment of the invention.

Figure 1:
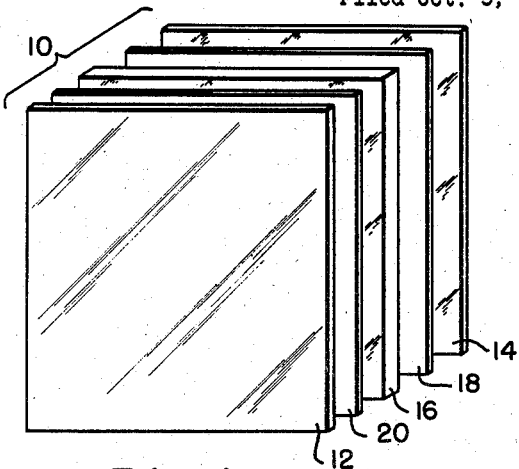
Figure 1 is a perspective view of the components of a laminated panel prior to its assembly in accordance with the present invention.
Figure 2:
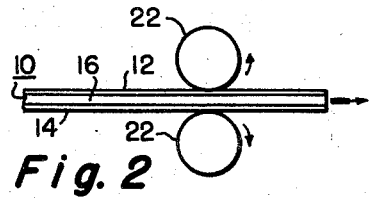
Figures 2 and 3 illustrate a nipping roll operation and a shattering operation which occur respectively prior to and subsequent to the laminating of the components.
Figure 3:
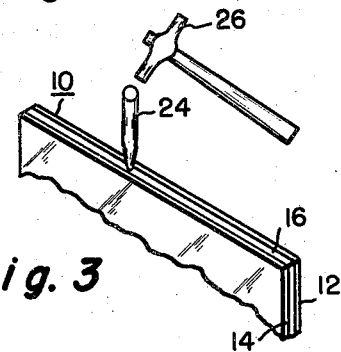
Figure 5:
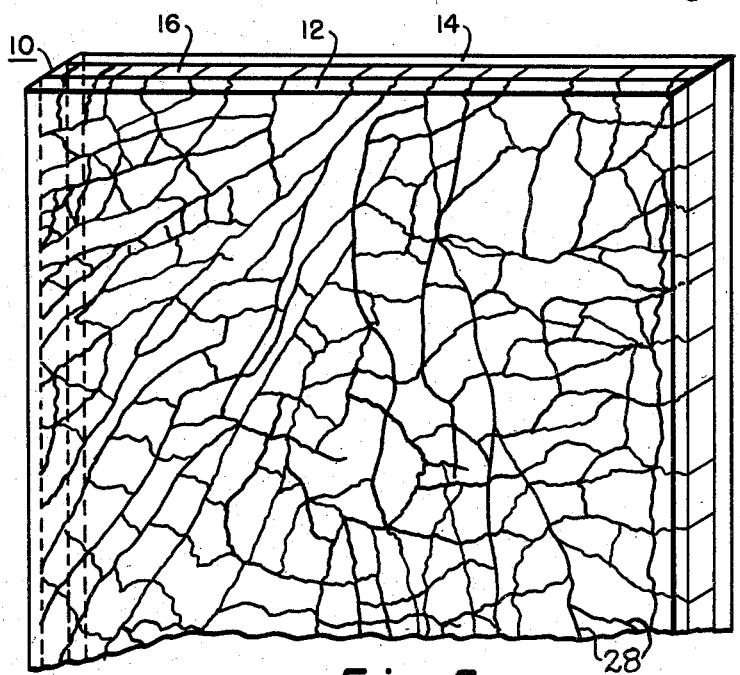
Figure 5 is a perspective view of a substantial portion of the finished glass panel.
Figure 4:
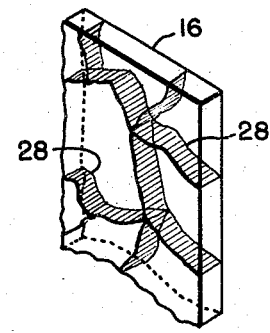
Figure 4 is an enlarged fragmentary view of the shattered component with the other necessary components omitted for the sake of clarity.

In Figures 1–5 of the drawings a decorative laminated glass panel 10 is shown consisting of two lites 12 and 14 of sheet or plate glass and an interposed middle lite 16 of tempered glass. In Figures 4 and 5 the sheet of tempered glass is illustrated in shattered condition. In the assembly of the laminated product, the bottom or outer lite 14 is placed horizontally on a support and a sheet 18 of polyvinyl butyral resin is placed on top of the lite 14. The resin layer 18 is a plasticized bonding and strengthening material and has substantially the same face dimensions as the lite 14. Then the tempered lite 16, having similar dimensions, is placed thereon. Another layer 20 of polyvinyl butyral resin is placed on the tempered lite 16 whereupon the final outer lite 12 is put in place on the layer 20 of resin. Other suitable bonding materials can be employed besides the polyvinyl butyral sheets 18 and 20. These materials are preferably selected from the group consisting of cellulose nitrate, cellulose acetate, polyvinyl acetate, and the esters of acrylic acid. However, any other suitable bonding material may be used.

After this relatively loose assembly of the parts has been completed, it is passed between a pair of nipping rolls 22 and is subjected to different stages of heat and pressure so as to laminate it into a permanent unit.

As shown in Figure 3, the permanently laminated unit is then shattered so as to transform it into the final panel 10 by puncturing an edge of the tempered lite 16 by means of a sharp tool 24, for example, a chisel or similar instrument. It is desirable that this tool 24 be forced into the surface of the tempered glass 16 at one or at several points until a strain line is encountered. The tool 24 is hit a blow by means of a hammer 26 to shatter the tempered lite 16 and impart the attractive reticulated subsurface pattern to the finished panel 10. When the lite 16 shatters into pieces, the pieces are confined and bonded between the outside lites 12 and 14. The cleavage planes 28, best seen in Figure 4, form a comprehensive network to the very edges of the lite and these cleavage planes in their short dimension extend between and generally perpendicular to the opposite faces of the tempered sheet so as to preserve partially the transparency thereof. In one embodiment of the invention, the distribution of the shatter lines was such that their total points of intersection had a frequency of occurrence of approximately twenty-five per square inch and the average included space between adjacent shatter lines was 1/4 inch. Substantially all of the areas bounded by crossed shatter lines had a minimum dimension in excess of approximately 1/16 inch but never exceeded approximately 1 1/4 inches in their maximum dimension. The complete traversal of the entire area by the network is best seen in Figure 5. The random pattern and widespread dispersal results according to a well-known characteristic of tempered glass when it shatters.

Figure 6:
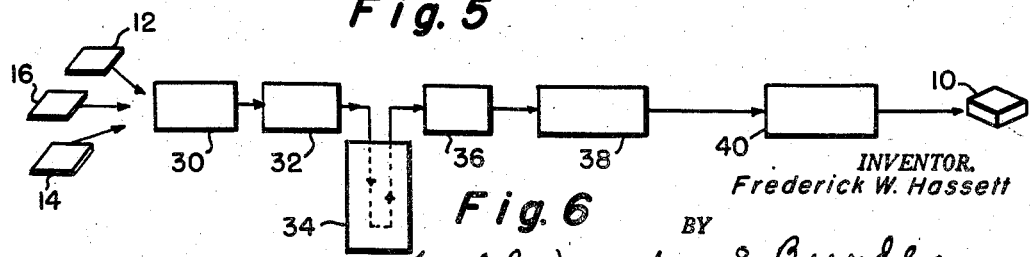
Figure 6 is a flow chart of the process of manufacture.

The following example in conjunction with the flow chart of Figure 6, illustrates a way that my process may be carried out to make one type of laminated glass panel which exemplifies the attractiveness of the product.

Example

Two 1/8 inch thick lites of untempered glass and a center sheet of 1/4 inch thick tempered glass, each having corresponding rectangular measurements were subjected to the following steps:

(1) A 0.015 inch thick sheel of polyvinyl butyral resin was placed on one of the 1/8 inch thick untempered glass lites. This sheet contained dispersed plasticizing agent within a stated percentage range in the resin to give greater or lesser flexibility to the sheet of resin, as desired, and to provide the desired cushioning effect. The thickness of the sheet of resin may be greater or less than 0.015 inch, as desired, so long as it tenaciously holds the parts of the panel together without allowing separation or clouding in service.

(2) The 1/4 inch thick sheet of tempered glass was placed on top of the sheet of resin.

(3) Another 0.015 inch thick sheet of polyvinyl butyral resin similar to that mentioned above was laid on the sheet of tempered glass.

(4) The other lite of ⅛ inch thick untempered glass was then laid on the uppermost resin sheet so as to form a complete assembly as schematically indicated by the block 30 in Figure 6.

(5) The assembly was passed between the nipping rolls indicated by the block 32 and corresponding to the diagrammatic showing of the nipping rolls 22 of Figure 2. The pressure on these two nipping rolls 22 was maintained in the usual fashion by means of vertically acting coil springs on both ends of each roll. After passing through the nipping rolls, the assembly was loosely held together and remained in this condition until the final laminating operation was performed.

(6) The assembly was moved through two passes in a nipping oven indicated by the block 34 in Figure 6. The transit time in this nipping oven was approximately 20 seconds and due to the fact that the oven temperature was 720° F. the panel assembly reached a final temperature of 150° F. on leaving the oven.

(7) The heated assembly was passed through three sets of two horizontal rolls each, indicated by the common block 36 in Figure 6. These six rolls were 48 inches in length by 8 inches in diameter and roll pressure was applied by means of coil springs in a general manner according to step 5, but with substantial pressure exerted on the assembly. The tempered lite was still in unshattered condition at this time. It is preferable that the shattering step be postponed until the last step of the process even though in some instances the middle lite 16 could be satisfactorily shattered in place before completion of the laminating operation.

(8) The rolled assembly along with other similarly rolled panels was placed in a metal basket, not shown, and introduced in a cylindrical autoclave tank indicated at the block 38 on the flow sheet. This tank was sealed so that when compressed air was introduced therein the internal pressure could be raised to 200 p.s.i. A large circulating fan provided in the autoclave in conjunction with suitable baffles, not shown, circulated the pressurized atmosphere in the autoclave tank over one or more steam heated coils therein to the point at which the air had a temperature of 300° F. and this temperature was maintained with the air continuously being recirculated by the fan. Toward the end of the autoclave period, cold water was introduced into the steam coils so as to gradually cool the circulating air in the autoclave to room temperature whereupon the pressure was released. From start to finish the autoclave cycle required 55 minutes and transformed the assembly into a permanently laminated panel.

(9) The shattering step of the tempered lite is represented by the block 40 in Figure 6. This step results in the finished panel 10 appearing as end product in Figure 6. The role of the bonding material in this step, in addition to holding the pieces of shattered, tempered glass in situ and in bonding the entire assembly tenaciously together, is also that of a cushion to isolate the shattering strains from the outer lites 12 and 14 so as to preserve them intact. Therefore, in the preparation of the bonding material into preformed sheets prior to being used, provision for incorporating a suitable plasticizing agent is important to it the proper cushioning effect. It is, of course, undesirable that any cracks appear in the outer lites 12 or 14 and any strains which the tempered sheet 16 tends to impart thereto must be absorbed by the intervening plastic bonding sheets 18 and 20 and thus be prevented from being communicated to the sound lites. The reticulated orientation of the lines of shattering is conventional, it being generally known that tempered glass has this faculty for the broadcasting of shatters completely throughout its dimensions.

The bonding material in the above example was clear polyvinyl butyral resin and the laminated sheets were clear glass. There was no tint or cloudy cast to be observed in the product and, in fact, it was a perfectly clear panel except for the fine cleavage planes in the internal sheet.

As herein disclosed the invention is shown embodied in a clear, laminated glass panel having a subsurface reticulated design. It is evident that a wide range of color selection is available in the panels through selecting various colors of the polyvinyl butyral resin or equivalent layers of bonding material 18 and 20 to be used or by using tinted sheet or plate glass panels 12, 14, 16. So also the nipping rolls and main rolls according to the respective blocks 32 and 36 of the flow chart, Figure 6, are described as being spring loaded for proper roll pressure, but it is evident that the pressure can be applied hydraulically or by means of compressed air or other gas. It is apparent that the autoclave step indicated by block 38 in the flow chart is not necessarily limited to a compressed air operation and that an oil autoclave or any other apparatus for providing heat and pressure can be used satisfactorily.

It is appreciated that once the panels embodying my invention are installed for the usage as above indicated such as for utility as windows, doors, and glass partitions, the lines of cleavage 28, according to Figure 4, will present but a minimum edge view to the observer normal to the surface of the panel 10 with the result that the present decorative design in no manner causes the laminated glass to appear opaque or to cloud after the fashion of certain laminated products which sometimes evidence this tendency. Due to the fact that the edges of the panels in many cases are installed in frames, these edges are protected without need for a filler or sealant to protect the margins of the shattered middle sheet and in any event, the fine crevices formed by the cleavage planes are entirely confined to a subsurface location in the body of the final laminated panel and thus are not exposed to dirt or sediment finding its way into the cracks. The intact outer lites 12 and 14 disposed one on each side assures this result, and the presence of these two sound sheets preserves the permanent integrity of the assembly.

Variations within the spirit and scope of the invention described are equally comprehended by the foregoing description.

I claim:

1. A laminated glass article comprising two, one-piece sheets of untempered glass and an interposed layer of tempered glass which has been shattered.

2. In combination in a decorative article, two substantially coextensive pieces of glass, one of which has been subjected to a tempering operation and in which a random pattern of shatters has been imparted to produce the desired decorative effect, said sheets being arranged face to face with said one sheet constituting the sole one which is shattered, and an interposed layer of bonding material holding them intact together in a permanent assembly relying, in the desired way, on the soundness of the other sheet.

3. In a decorative article, a plurality of assembled sheets of glass in which at least one but less than the total number is tempered glass and in which the tempered glass only is shattered, having been shattered in situ following assembly, and a layer of cushioning material between each two glass sheets bonding them intact together in a manner to isolate the strain of shattering said shattered glass from the next sound sheet.

4. A laminated assembly of transparent glass comprising outer sheets and a separate inner sheet of tempered glass therebetween which has been shattered to provide a reticulated pattern of decorative cleavage lines of which the various planes of cleavage are arranged to extend between and generally mutually perpendicular with respect to the opposite faces of the tempered sheet, and a bonding material between the inner sheet and each outer sheet to anchor the shattered fragments of the tempered glass in situ so as to hold together the reticulations immediately on inception in the assembly and thus preserve their orientation.

5. A unitary assembly of transparent glass comprising an intermediate sheet of tempered glass interposed between a plurality of untempered sheets parallel thereto, and a plasticized layer of shock-cushioning bonding material disposed between said tempered sheet and each of the others adjacent thereto, said intermediate tempered sheet having been shattered in situ to introduce a three-dimensional decorative effect from its subsurface position between the shock-cushioning bonding layers, with said bonding material being selected from the group consisting of polyvinyl butyral, cellulose nitrate, cellulose acetate, polyvinyl acetate, and esters of acrylic acid.

6. A unitary assembly of glass comprising an intermediate sheet of tempered glass interposed between a plurality of untempered sheets parallel thereto, and a plasticized layer of bonding material disposed between said intermediate sheet and each of the other sheets, said intermediate tempered sheet being in shattered condition so as to define a reticulated pattern of decorative cleavage lines of which the various planes of cleavage are arranged to extend between and generally perpendicular to the opposite faces of the tempered sheet, said bonding material having the combined function of a cushion to isolate the shock of shattering said tempered sheet from the other sheets and to anchor said shatters in situ so as to preserve their initial orientation and to hold the parts in assembled relation.

7. A method of manufacturing decorative panels of laminated glass, comprising assembling sheets of the glass to be laminated together, in arrangement with an intermediate sheet of tempered glass, bonding the sheets permanently together by means of interposed layers of bonding material between the successive sheets of the panel, and selectively shattering the intermediate sheet in situ to impart a decorative effect to the panel.

8. A method of manufacturing panels of laminated glass, comprising assembling sheets of the glass to be laminated together, in an arrangement with one tempered sheet of glass solely present and said sole tempered sheet disposed in the middle and with interposed layers of bonding material between successive sheets of that panel so as to bond them together with the tempered sheet in the middle, subjecting the assembly to heat and to pressure to permanently bond the parts thereof, and selectively shattering the tempered one of the sheets in situ, relying on the soundness of the outer sheets to preserve the permanent integrity of the assembly.

9. In a method of manufacturing laminated glass for installation as decorative glass panels, said panels including an intermediate sheet of tempered glass therein, the steps of mechanically stressing to failure said intermediate sheet of tempered glass along at least one strain line therein by means of a contacting tool so as to cause selective shattering of the tempered glass only, and installing the glass so as to utilize it as a panel for imparting the desired decorative effect.

10. A method of manufacturing laminated glass for installation as decorative glass panels, comprising assembling sheets of the glass to be laminated together in an arrangement with a center sheet of tempered glass between two untempered lites and with interposed sheets of bonding material for bonding them together, passing the assembly between nipping rolls, subjecting the assembly to heat and pressure to permanently laminate the sheets into a panel, and selectively shattering the center sheet in situ, and installing the glass thus produced at a point of utility as a panel to produce a decorative effect.

11. A method of production of decorated laminated assemblies made of glass comprising bonding an assembly of glass laminations together, and puncturing an edge strain line of, and thereby shattering at least a selected one but less than the whole number of laminations, said selected lamination being an inner one and consisting of tempered glass enabling the shattering thereof to impart a subsurface design broadcast transversely through the entire assembly.

References Cited in the file of this patent

UNITED STATES PATENTS

| | | |
|---|---|---|
| 1,219,853 | Okada | Mar. 20, 1917 |
| 1,923,070 | Belknap | Aug. 22, 1933 |
| 2,357,399 | Gregory | Sept. 5, 1944 |

FOREIGN PATENTS

| | | |
|---|---|---|
| 396,313 | Great Britain | Aug. 3, 1933 |